UNITED STATES PATENT OFFICE.

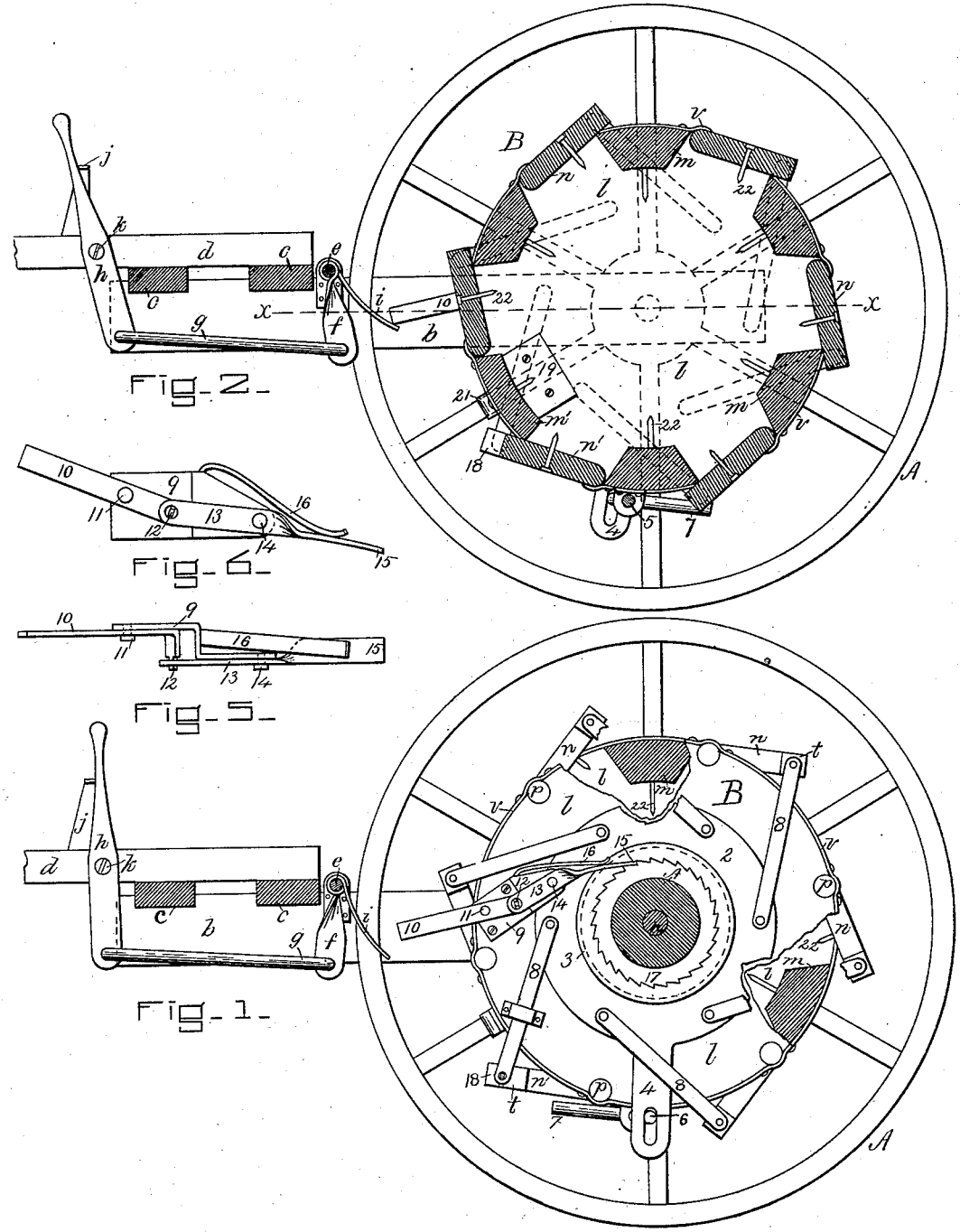

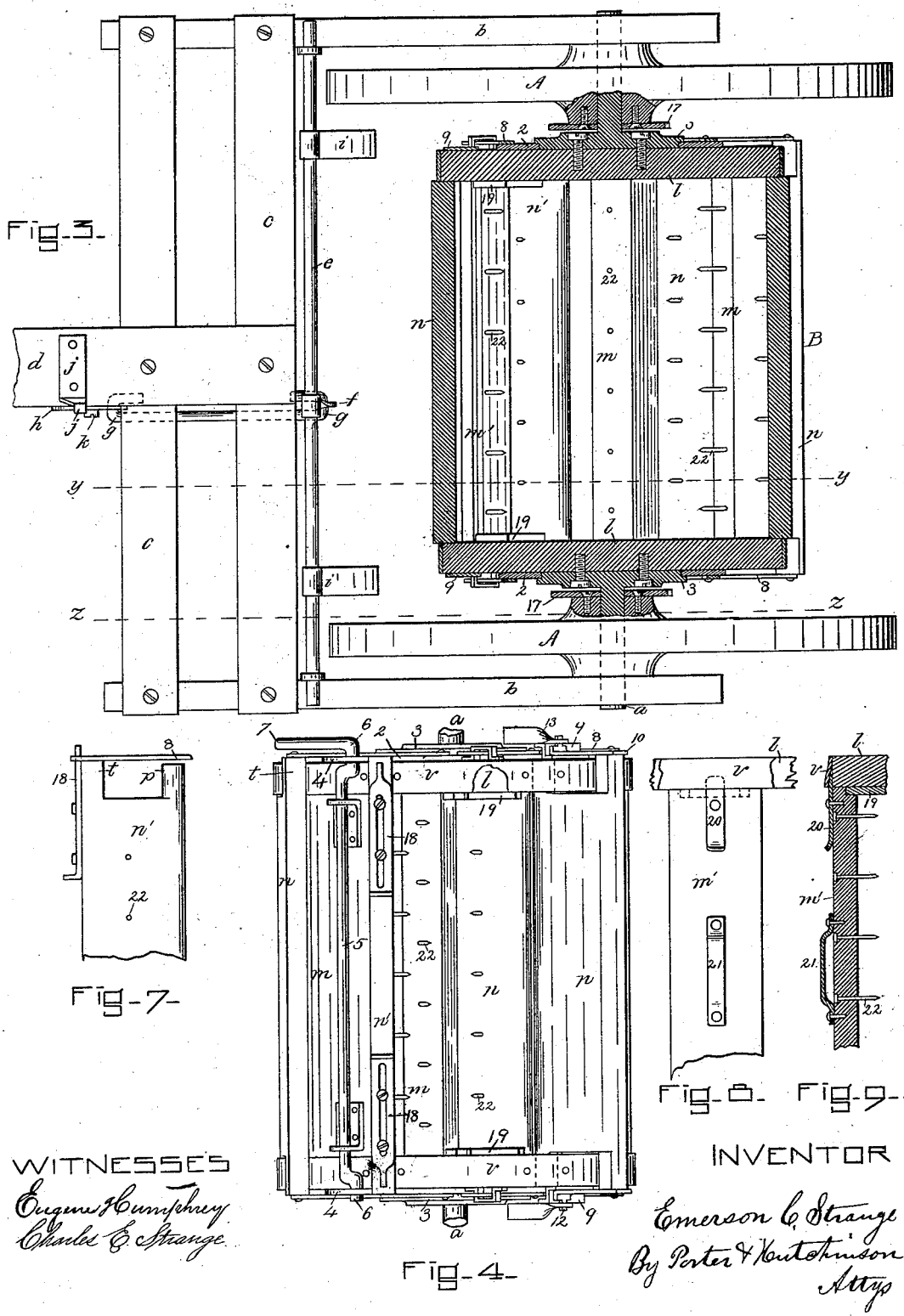

EMERSON C. STRANGE, OF TAUNTON, MASS., ASSIGNOR OF TWO-THIRDS TO ELIAS STRANGE AND ELIAS W. STRANGE, BOTH OF SAME PLACE.

MANURE-SPREADER.

SPECIFICATION forming part of Letters Patent No. 285,086, dated September 18, 1883.

Application filed October 30, 1882. (No model.)

*To all whom it may concern:*

Be it known that I, EMERSON C. STRANGE, of Taunton, State of Massachusetts, have invented an Improved Manure-Spreader, of which the following is a specification.

This invention relates to rotary manure-spreaders which are mounted on wheels; and it consists in the construction and combination of the divers devices embodied therein, as hereinafter more particularly and fully set forth and claimed.

Figure 1 is a side sectional elevation of a manure-spreader embodying my invention, the section being taken on line $z\ z$, Fig. 3, and portions of the heads of the drum (shown in elevation) being broken away to show interior devices. Fig. 2 is a transverse section taken through the drum and cross-bars on line $y\ y$, Fig. 3. Fig. 3 is a horizontal longitudinal section of the drum, taken on line $x\ x$, Fig. 2, the other parts being shown in plan. Fig. 4 is a detached plan view of the drum, showing the graduating opening devices. Fig. 5 is a detached plan view of the device, whereby the drum and wheel ratchets are interlocked. Fig. 6 is a side elevation of the same. Fig. 7 is an enlarged plan view of a portion of the hinged filling-gate, and showing the locking device. Fig. 8 is a plan view of a portion of the removable filling-gate, and showing the handle and one of the securing-buttons. Fig. 9 is a longitudinal vertical section of the parts shown in Fig. 8.

In said views, A A are the wheels, and B the drum, which is supported on the wheels by arbors $a\ a$, which extend outward from the heads of the drum and constitute the axes of the wheels. On each arbor $a$ is mounted a wheel-bar, $b$, which bars are at the front united by cross-bars $c\ c$, to which is secured pole $d$. A small rock-shaft, $e$, is pivotally arranged on bars $b$, and has rigidly mounted or formed upon it two arms, $i\ i$, which engage pawls upon drum B, as will be described. A lever or arm, $f$, is also rigidly formed or secured upon said rock-shaft, and is connected with hand-lever $h$, pivoted at $k$ to pole $d$ by connecting-rod $g$. When the top of hand-lever $h$ is thrown back, as shown in Fig. 1, said arms $i$ are depressed, and vice versa. When lever $h$ is moved forward, it may be locked in catch $j$, secured on pole $d$, as shown in Figs. 2 and 3. Drum B is formed with heads $l\ l$, which may be of either wood or iron, and when of the former flanges 3 are secured to said heads, and wheel-arbors $a\ a$ are either secured in or formed as integral parts of their respective flanges, and when said heads are formed of iron the arbors $a$ may be secured directly in or formed as an integral part of their respective heads; or, if preferred, a continuous arbor or axle may extend through the drum and at its respective ends support wheels B; but I prefer to leave unobstructed the interior space of the drum. Heads $l\ l$ of the drum are rigidly united by a series of bars or lags, $m$, which at their ends are secured to the respective heads by any suitable means. Another set of lags, $n$, are formed at their respective ends with a round pin or tenon, $p$, at one edge, and with a corresponding lug or extension, $t$, at the opposite edge, and are hinged in heads $l$ by the insertion of their tenons $p$ in corresponding holes in said heads, adjacent to the periphery thereof, a metallic band, $v$, being arranged to encircle heads $l$, and to secure in position lags $n$ by engaging their said tenons $p$, as shown in Fig. 1. Said hinged lags $n$ are wider than the space between the fixed lags $m$ and overlap the latter, as shown in Figs. 1 and 2.

For the purpose of partially opening and closing lags $n$ by vibrating them upon their pivots $l$, I arrange on each of heads $l$ a concentric ring, 2, which is centered on flange 3, or upon a series of small rolls secured to the head, or upon studs secured therein, the rings being arranged to rotate on their bearings, and they are each formed or provided with a slotted arm, 4, (Shown in Figs. 1, 2, and 4.) A crank-shaft, 5, secured on a fixed lag $m$ in bearing-brackets, as shown in Fig. 4, and having an arm, 7, by which to rotate it, is at its cranks 6 6 seated in the slot in arms 4 4 of rings 2 2, as shown in Fig. 4.

A series of connecting rods, 8, equal in number to hinged lags $n$, are pivoted at one of their ends to rings 2, and at their opposite or outer ends to lugs $t$ of lags $m$, and by partly revolving crank-shaft 5 by means of its arm 7 in one direction its throws 6, acting on arms 4 of rings 2, will partly rotate said rings, and thereby cause its rods 8 to swing outward or open the lags $n$, to which said rods are pivoted, while a reverse movement of arm 7 of rod 5 will close lags $n$ upon lags $m$, thereby closing the drum. For the purpose of causing the drum to be either rotated coincident with the wheels A or to be non-rotative, I apply to each wheel-hub a ratchet, 17, with which a pawl, 15, is engaged or disengaged by the following-described means: An angle-bracket, 9, Figs. 4, 5, 6, is rigidly secured to each head $l$, and at the outer end thereof is pivoted angle-lever 10 at 11, the angle 12 of which engages the outer end of pawl-lever 13, which is pivoted at 14 to bracket 9, the inner or pawl end, 15, of said lever 13 being habitually held in contact with ratchet 13 by spring 16. Lever 10 extends outward from the drum a distance sufficient to secure its contact with arms $i$ on rock-shaft $e$ when brake-lever $h$ is engaged with catch $j$, as shown in Fig. 2, and when levers 10 are so engaged with arms $i$ they trip pawl-levers 13 and disengage the pawl end 15 from the ratchets 17, thereby disconnecting the wheels and drum. Such contact of levers 10 and arms $i$ also serves to hold the drum from rotation, in which condition the wheels revolve on their arbors $a$, while if the drum were disengaged the wheels, drum, and arbors would all coincidently revolve.

For facility of filling the drum, one of the hinged lags (marked $n'$) is provided with sliding bolts 18, secured to its edge and arranged to engage with and be disengaged from the coacting pair of rods 8, which are pivoted on rings 2, and which engage and actuate the lags $n$, as before described. When said bolts are slid inward, as shown in Fig. 4, they are disconnected from rods 8 and the lag may be swung freely and fully open; and when they are slid outward, as shown in Fig. 7, they are engaged in their respective rods 8, as shown in that figure. I also arrange the lag $m$, (marked $m'$,) that is adjacent to the swinging edge of the pivotal opening lag $n$, so that it is removable at will, in order to provide an opening of the desired width to facilitate filling the drum. For the internal support of such removable lag $m'$, two stops, 19, Figs. 2, 4, are secured upon the inside of heads $l$, and upon these the lag rests. This lag is locked in position by a pivotal bolt, 20, secured at each end, and arranged to be secured under the metallic bands $v$, that encircle heads $l$, as shown in Figs. 8, 9. A handle, 21, on removable lag $m'$ serves as the means of removing and replacing the lag. A series of studs, 22, secured in lags $m$ $n$ and projecting into the cavity of the drum, serve to comminute the manure as it is moved over and past them by the rotation of the drum.

When it is desired to fill the drum, bolts 20 are disengaged from bands $v$, and the lag $m'$, secured by said bolts, is removed, and bolts 18 are slid inward and disengaged from rods 8, when lag $n'$, to which said bolts are secured, is swung open, when the drum is readily filled, after which lag $m'$ is replaced and locked in position, and lag $n'$ is connected with rods 8, crank-shaft 5 being in such position that lags $n$ are closed down upon lags $m$, as shown in Fig. 2. When thus loaded, and being driven afield, if it is desired to revolve the drum, in order to pulverize the contents, brake-lever $h$ is disengaged from standard $j$, as shown in Fig. 1, thereby allowing pawls 15 to engage ratchets 17, as described; but if it is not desired to rotate the drum, the brake-lever is engaged with catch $j$, thereby disengaging the pawls from ratchets 17 and securing the drum from rotation. When it is desired to distribute the contents, crank-shaft 5 is rotated by its arm 7 to open lags $n$ to the desired extent, and pawls 15 are engaged with their ratchets, when, as the spreader moves forward, the contents will be delivered upon the ground in proportion as lags $n$ have been opened.

I am aware that rotary manure-spreaders have been both made and patented, and hence I only claim the construction and combination of the devices invented by myself and embodied in my invention.

I claim as such—

1. The combination of rings 2, hinged lags $n$, and rods 8, pivotally connected with said rings and the moving edge of the lags, and means for actuating said rings to open or close said lags, substantially as specified.

2. The combination of crank-shaft 5, with means for actuating the same, rings 2, with their arms 4, connected with the throws of shaft 5, the pivoted lags $n$, and rods 8, connected with said rings and lags, all substantially as specified.

3. The combination of heads $l$, lags $m$, rigidly secured thereto, and lags $n$, pivotally secured at one edge and arranged to overlap lags $m$, and provided with means whereby they may be opened and closed, substantially as specified.

4. The combination of ratchets 17, secured to the wheels, pawls 15 on drum B, lever $h$, and connecting devices, whereby said pawls may be engaged with and disconnected from said ratchets, substantially as specified.

5. The combination of lever $h$, rod $g$, shaft $e$, with its arms $f$ and $i$, lever 10, pawl-lever 13, and engaging-spring 16, all substantially as specified.

6. In combination with drum B, a hinged lag, $n$, arranged to be disengaged from its actuating devices and opened independently thereof, and an adjacent lag, $m$, constructed and arranged to be released and removed at will, and to be bolted and secured in position, substantially as specified.

EMERSON C. STRANGE.

Witnesses:
THOMAS W. PORTER,
EUGENE HUMPHREY.